United States Patent [19]

Sudama et al.

[11] Patent Number: 5,555,375
[45] Date of Patent: Sep. 10, 1996

[54] METHOD AND APPARATUS FOR NETWORK COMPUTER SYSTEMS MANAGEMENT GROUP ADMINISTRATION

[75] Inventors: Ram Sudama, Hudson; David M. Griffin, Maynard, both of Mass.; Brad Johnson, Westerly, R.I.; Dexter Sealy, Boston, Mass.; James Shelhamer, Maynard, Mass.; Owen H. Tallman, Lunenburg, Mass.

[73] Assignee: Digital Equipment Corporation, Maynard, Mass.

[21] Appl. No.: 373,513

[22] Filed: Jan. 12, 1995

(Under 37 CFR 1.47)

Related U.S. Application Data

[63] Continuation of Ser. No. 722,867, Jun. 28, 1991, abandoned.

[51] Int. Cl.$^6$ .................................................. G06F 9/40
[52] U.S. Cl. ................... 395/200.03; 395/650; 395/800; 364/DIG. 1
[58] Field of Search ................................... 395/650, 800, 395/200.03

[56] References Cited

U.S. PATENT DOCUMENTS

| | | |
|---|---|---|
| 4,456,958 | 1/1984 | DeSantis et al. . |
| 4,525,780 | 6/1985 | Bratt et al. . |
| 4,558,413 | 12/1985 | Schmidt et al. . |
| 4,644,496 | 2/1987 | Andrews . |
| 4,656,579 | 4/1987 | Bachman et al. . |
| 4,800,488 | 1/1989 | Aqrawal et al. . |
| 5,005,122 | 4/1991 | Griffin et al. ...................... 395/200.01 |
| 5,129,084 | 7/1992 | Kelly, Jr. et al. ...................... 395/650 |
| 5,136,716 | 8/1992 | Harvey et al. ...................... 395/200.06 |
| 5,241,673 | 8/1993 | Schelvis ...................... 395/600 |

FOREIGN PATENT DOCUMENTS 0367699 5/1990 European Pat. Off. .
0426911 5/1991 European Pat. Off. .

OTHER PUBLICATIONS

Cheriton, et al., "Distributed Process Groups in the V Kernel"; ACM Transactions on Computer Systems vol. 3, No. 2, May 1985, New York US pp. 77–107.

Liang, et al., "Process Groups and Group Communications: Classifications and Requirements"; Computer vol. 23, No. 2, Feb. 1990, Los Alamitos, CA, US pp. 56–66.

Shimizu, et al., "Hierarchical Object Groups in Distributed Operating Systems"; 8th International Conference on Distributed Computing System 13 Jun. 1988, San Jose, CA pp. 18–24.

Schelvis et al., "The Implementation of a Distributed Small-talk," *ECOOP '88 Proceedings* Lecture Notes in Computer Science 322, Springer—Verlag, pp. 212–232.

*Primary Examiner*—William M. Treat
*Attorney, Agent, or Firm*—Christine M. Kuta; A. Sidney Johnston

[57] ABSTRACT

The following is a method and apparatus for administering an operation specified for performance on a set of independently managed hosts. The operation is received initially by one of a plurality of management servers in a managed host system. The operation, specifying a group object, is transferred to the management server designated by the system to administer the operation specified on the group object. The designated management server thereafter decomposes the group object into constituent objects which may be host objects or additional group objects. Next, the locally administered objects are scheduled for execution on the hosts administered by the designated management server. The non-locally administered objects are transferred to the management servers identified in a database for administering the objects. After executing the operation on the host objects, the host objects and group objects return status information back to the designated management server. The status information is then transmitted to the management server that initially received the operation.

8 Claims, 4 Drawing Sheets

| OBJECT | DESIGNATED MANAGEMENT SERVER | MEMBERS |
|---|---|---|
| Grp1 | M1 | c1, Grp2 |
| c1 | M1 | |
| Grp2 | M2 | c2, c3, Grp3 |
| c2 | M2 | |
| c3 | M2 | |
| Grp3 | M3 | c4, Grp4 |
| c4 | M3 | |
| Grp4 | M4 | c5, c6 |
| c5 | M4 | |
| c6 | M4 | |

METHOD AND APPARATUS FOR NETWORK COMPUTER SYSTEMS MANAGEMENT GROUP ADMINISTRATION

This application is a continuation of application Ser. No. 07/722,867, filed Jun. 28, 1991, now abandoned.

FIELD OF THE INVENTION

The present invention relates to data processing networks, and more particularly, to methods for automatically replicating user supplied requests for execution of functions on multiple network resources referred to hereinafter as management services. The management services are distributed over large numbers of networked computer systems operating in a remote systems management (RSM) environment. RSM generally involves performing system and application management functions over a network. For example, if creating an account on a local system is a management function, then creating an account on a system over the network is a remote systems management function. The present invention relates to features provided at the application design layer of a network architecture.

BACKGROUND OF THE INVENTION

Distributed processing in computer network systems provides a means for apportioning workload to multiple available network resources by transferring operations and data between many locations, or nodes, in the network. At the lowest processing level of the network system, the workload consists of various user specified functions executed on various network resources. Typically, processes operating on the various network resources perform the specified functions in a local system environment. These processes receive descriptions of functions to be performed and relevant data. Based on this information the process performs the requested function and, if necessary, returns the results on the network links to a destination indicated in the operation record header. The processes that actually perform the functions as well as their administrators or management servers exchange information with each other over the data network in a controlled manner according to a set of predetermined rules for communicating on the network or communication protocol.

RSM provides automated management services to large numbers of networked resources in a network in order to provide de-centralized execution of RSM operations by objects. The management services consist of a set of related functions performed on network resources. Some of the objects in the network are "host" objects. Host objects, also referred to hereinafter as "hosts", provide the resources to execute functions described in the operations received from users of the network. Examples of host objects are work station operating systems, processes running on personal computers or other operating systems which administer the management services provided in a network.

Another form of object is the "group" object. A group object specifies operations to be administered independently by two or more host objects. The objects specified by the operations may comprise host objects or additional group objects.

Management servers, which are also objects, assist network communications by routing operations to appropriate network resources for performing the functions specified within the operations. In addition a management server may decompose certain group operations designated by group composition lists contained within a global database accessible by all management servers. The constituent objects of a decomposed group object may be either additional groups or hosts. The management server forwards the group or host objects to other management servers if necessary according to the relations specified by group composition lists contained within the database. In addition to the previously described functions, management servers administer operations to certain hosts designated by the database.

The management server that first receives an operation from a point of access for receiving operations from network users is referred to hereinafter as the "originating" management server. The management server which administers operations to the specified host object in the operation or which decomposes a group object is referred to hereinafter as the "designated" management server. A group has only one originating management server but may contain groups or hosts with other designated management servers.

Management servers consult a network (global) database in order to obtain routing information for forwarding operations to the designated management server(s) for the target hosts. The network database, whose contents may be read by all the network management servers, provides lists of hosts and groups and the hosts and groups' designated management servers. The management servers utilize this database for distributing group objects and forwarding operations to designated management servers.

Known systems provide parallel execution of applications programs; however, these systems do not permit parallel management of application programs. The actual scheduling and administration of an application is provided in the prior art only on local systems. Therefore, it is possible for parallel execution of parts of an application; however, the programs which supply these parallel operations cannot be executed in parallel, and therefore in known systems these programs must be executed only one at a time by a single management server.

Furthermore, known management systems for distributed data processing systems typically permit a user to invoke the performance of multiple operations on a group of host objects by means of a single command or request. However, these prior systems locally define groups of hosts, and those hosts are all administered by a single management server. That single management server is the only management server permitted to submit operations to the group of hosts.

As a consequence of local definition of groups in known prior systems, a user may submit a command specifying an operation to be performed on a group of objects; however, only the single management server holding the group's composition definition possesses the capability to decompose the command. Therefore, the user may specify a plurality of operations to be performed on separate hosts by means of a single command which specifies a group of "member" objects. However, as soon as the group command is parsed by the user interface it is transferred to a management server. The management server decomposes the group into individual members, and each of the members in turn is scheduled for serial administration by the same single management server to which the user submitted the group command. A set of hosts directly coupled to the management server perform the individual operations specified in the group command. Such a restriction on all activity of a group operation to a single management server limits the number of systems for executing member commands which may be usefully included in a group command.

SUMMARY OF THE INVENTION

The present invention permits an application to invoke the performance of operations that are executed on hosts administered by different management servers. Furthermore multiple copies of the same operation may be distributed and simultaneously executed on multiple systems administered by multiple management servers. To this end, a network mapping and operation distribution mechanism is introduced for describing how a group of objects should be distributed to a number of host objects administered by independent management servers.

The present invention permits management servers to decompose group operations and to distribute the resulting operations to other management servers. The resulting operations are then performed in parallel by host objects under the control of the other management servers. This capability to transfer decomposed operations to other management servers permits groups to be nested in a hierarchical manner for decomposition and performance of operations in parallel by a theoretically unlimited number of management servers and their host systems.

In addition, the groups may be organized to efficiently utilize the available resources for performing management operations. Since the system provides means for management servers to decompose a group of objects and transmit the resulting set of objects to other management servers, a network architect may use the ability to define group objects in order to configure a network into a topology for executing a large number of individual service requests in a massively parallel manner by nesting groups within groups. Using the group command mechanism of the present invention, a user could theoretically request a number of operations for parallel execution on a number of separate hosts coupled to distinct managers using a single command. The number of operations executed in parallel is restrained only by the number of management servers to which the operations may be transferred to perform the requested function. The use of group commands to provide parallelism in operations performed on separate systems in a network environment will become clear when discussed in connection with the description of the preferred embodiment.

The Group Administration Facility for RSM utilizes an object-oriented approach to naming managed entities. These objects are either the managed systems themselves or groups of managed systems. Each group employs a designated management server. The designated management server administers management services for the group. For group objects, the names of the group members are stored on a global name space. When any operation is invoked on an object, the management server at which the operation originates, called the "originating" management server, determines the designated management server for the object in the name space. The operation is thereafter delivered to that management server.

When a designated management server receives an operation specified on a group object, the designated management server consults the global name space then dispatches a copy of the original operation to the designated administrators for each of the objects listed as members of the group. This process recurs until all groups have been decomposed into their component members, and all operations have been delivered to the designated management servers for those members. Thus, the method according to the present invention significantly increases the flexibility in the way group operations are composed and executed and provides a powerful tool for executing massively parallel operations on a network system.

In addition, group names may be used uniformly by any user access point in the network. Therefore, if the group operation resulting from the submission of a group command by a user is not initially received by the designated management server, it will be transferred to the designated management server and thereafter group decomposition will commence. The advantages of this and other advantages will become clear when discussed in conjunction with a description of an illustrative embodiment of the present invention.

DETAILED DESCRIPTION OF THE PREFERRED EMBODIMENT

The present invention generally relates to a group administration facility for use in a data processing network. The group administration facility replicates and distributes a number of management operations to numerous management servers within the network to be performed on numerous hosts. A group is a set of global objects which can be referred to by a single name. The individual host objects are members of this group. In the preferred embodiment, a list of such names is maintained on a global database.

One of the special features of a global database is its scalability. The database for supporting the decomposition of group objects can support as few or as many simultaneously executed network functions as the system designer demands and the network hardware can support. Furthermore, the execution of group requests is programmable. Thus, by manipulating the group lists, the system programmer may alter the execution of group commands on a network. This software approach, as opposed to the hardwired approach, leads to a high degree of flexibility in system design for parallel execution of group commands.

The preferred embodiment of the present invention uses a global name space mapping facility and recursive algorithm to provide a dynamic description of the group distribution scheme. Accordingly, a system programmer may alter the distribution of a group command by changing the contents of the group lists contained in the global name space provided by a global database service. Therefore, the present invention not only provides a means for executing multiple operations specified by a single command by means of a plurality of management server, it also increases versatility in distributing a group operation resulting from a group command among the management servers.

Remote system management (RSM) facilities enable a user to specify a function to be performed over a network. Such facilities allow an originating management server to receive the function request, then forward the request in the form of a network operation to the designated management server responsible for coordinating execution of the request. The designated management server transfers the operation to the host object specified by the operation to perform a function specified in the operation record. Since decomposition of group commands for execution by a plurality of designated management servers requires the capability of forwarding an operation on a network, the present invention is particularly well suited for implementation on a network possessing RSM capabilities.

Figure 1:
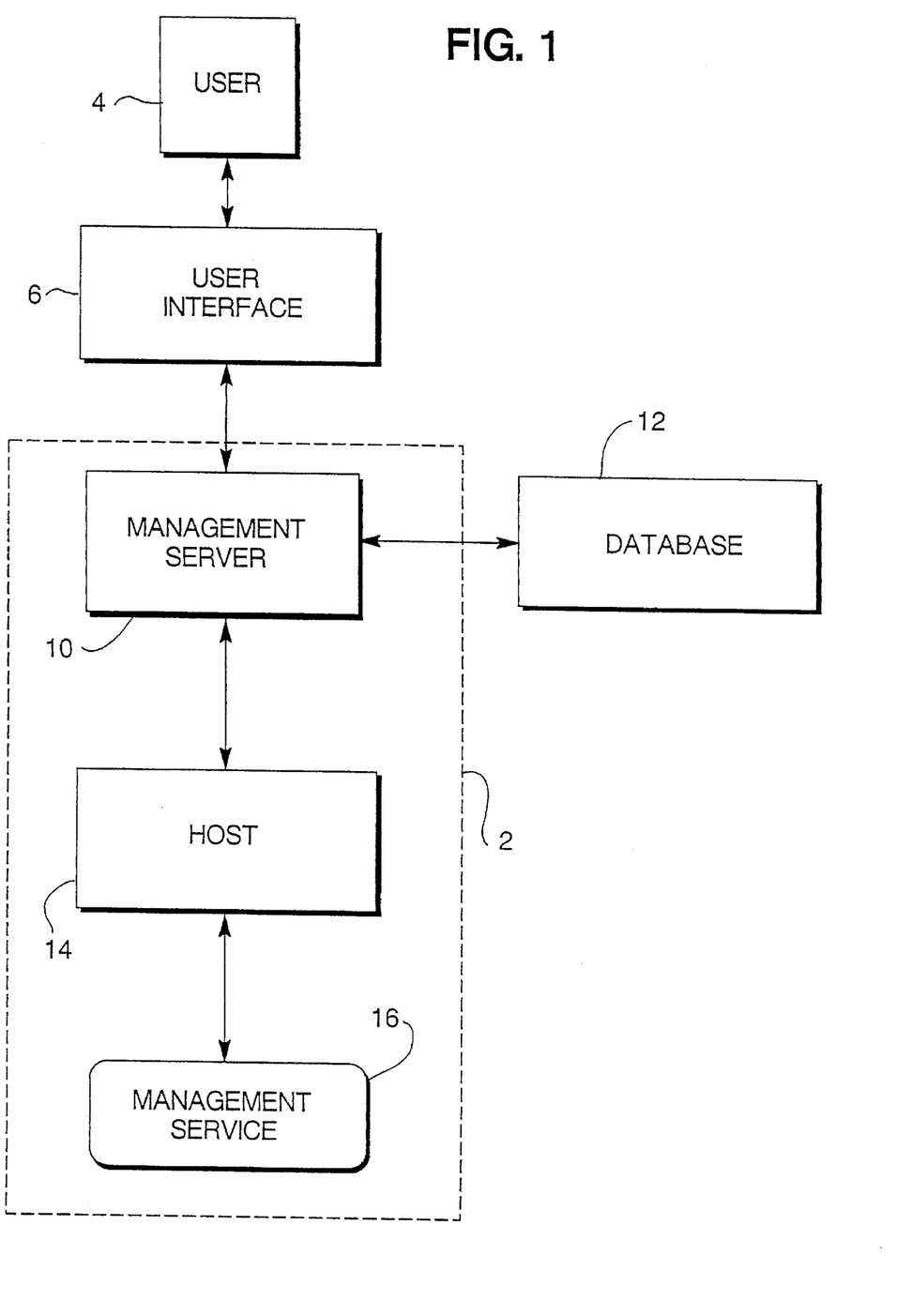
FIG. 1 is a block diagram of a management server and host system suitable for use in the present invention.

FIG. 1 shows a diagrammatic illustration of the interrelated processes comprising a system 2 suitable for connection in a network embodying the present invention. These processes may be executed by a diverse range of computing and peripheral resources as would be known to one skilled in the art. The current invention is particularly well suited for implementation in a network environment containing a plurality of management servers; however, the actual choice of hardware is not intended to limit the scope of the present invention.

At the top layer of the system's operation, the user submits a command to the user interface 6. The command may be either a group operation or single operation to be performed by the network. The user interface 6 transforms the command into a packet of information constituting an operation. The fields contained within the header of the operation record significant to the present invention are explained hereinafter. As would be known to those of ordinary skill in the art, other fields may be included or header fields described hereinafter may be amended without altering the functionality of the present invention.

One of the fields comprising the packet header is the "packet type" field. This field is used in the current invention to identify the packet as a description of a function to be performed by one or more network resources, or in other words, an operation record type. This field also identifies a return message from a designated management server when responses are required.

An operation identification field holds a unique identifier for each operation request by a user. The identifier allows the system to track the execution of the operation and notify the user when the system completes performance of the specified operation.

The operation record header contains an owner field. The owner field specifies a unique identification of the ostensible user who submitted the network request. The security mechanisms utilized by the system to limit access to restricted resources use the owner field in conjunction with a privileged user list in a data base to grant or deny access to the resource specified in the operation record.

The target object field contains the name of the global object to be acted upon by a management server. The originating management server references the target object field in order to determine the designated management server which coordinates execution of the operation. An originating management server obtains the designated management server's name by means of a global name space.

The operation record header contains a parent identification field. In group operations, this field specifies the operation from which the current operation record was generated. A parent address field in a child operation record specifies the address where the parent of a group operation awaits the results of this child operation. A child identification field in the parent operation lists the identifier for each child operation generated from the parent group operation.

The operation record also contains a field specifying the management server which first dispatched the operation. This management server, as previously noted, is called the originating management server and will coordinate return messages to the user upon completion of the operation. Another field specifies the ultimate ancestor operation for an operation record. In addition, the operation record contains a list of group ancestors in order to facilitate the detection of group looping.

A forwarder address field is included in the set of fields contained within the routing header. The forwarder address lists the address of the management server that previously forwarded the operation. The forwarder address provides the means for transmitting status information back to the parent operation along the same path the operation traversed in reaching its designated management server.

In addition to these afore-described fields, other fields may be included in the header field in order to meet various design objectives of network system architects as is known in the art. In addition, one may not always require all of the previously described fields in order to meet the design demands of particular systems as will be appreciated by one skilled in the art.

The user interface 4 transmits the operation to the next lower layer of the system architecture which contains a management server 10. The management server 10 which initially receives the operation is called the "originating" management server. After receiving the operation, the originating management server references the target object field of the operation record and in conjunction with the globally accessible common database 12, determines the identity of the designated management server for the identified target object. The originating management server then forwards the operation record to the designated management server for the object specified in the target object field in the operation record.

After a designated management server receives a single operation describing a single function for performance by one of the resources under its administrative control, the management server 10 transfers the operation to the designated host 14 identified in the target object field of the operation. A host 14 denotes any object on which management services are performed. The operation received by the host may arise from a single command or a decomposed group command. The host 14 level of the network architecture comprises the next lower layer in the network system.

Finally, the host 14 transfers the function description and appropriate parameters to a management service 16 which comprises the bottom layer of the network system. As used herein, a management service denotes any set of related operations for performing requested functions. After receiving the necessary information for performing the requested function, the management service 16 carries out the function and returns any relevant parameters to the host 14 when performance of the function is complete. If return information is required for the user or another service on the system, then the information is transferred from the host 14 to the management server 10. The management server 10 then executes a return message to the originating management server or if generated as part of a group command, then a return message is transmitted to the parent management server from which the executed operation was created.

Figure 2:
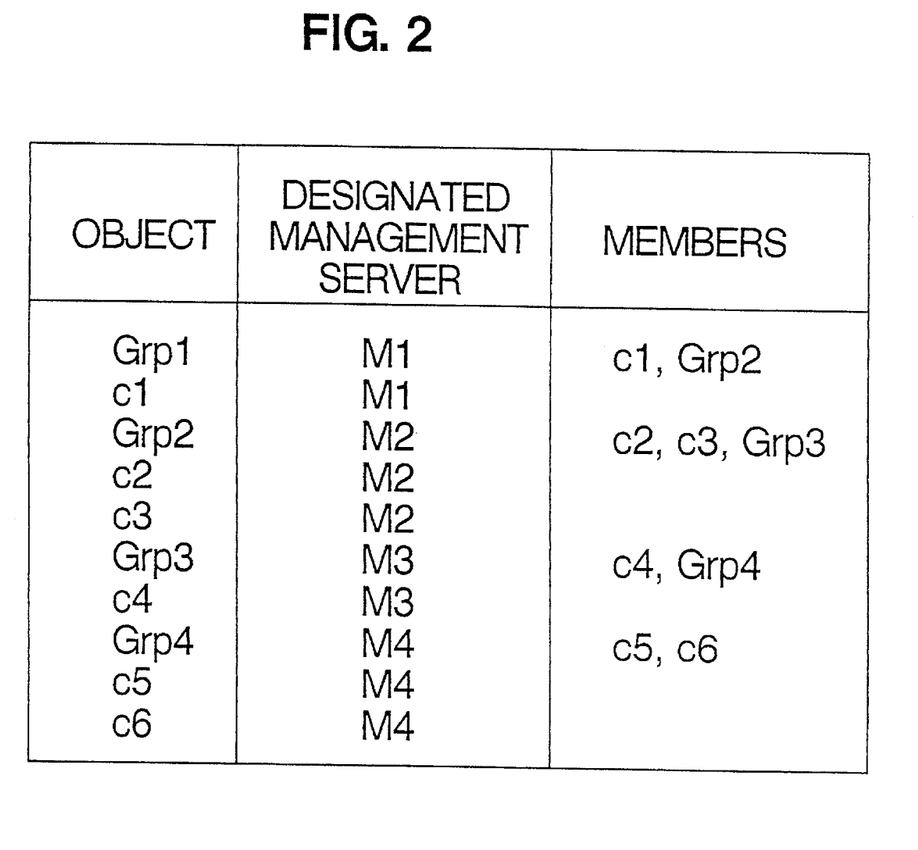
FIG. 2 is a chart depicting an illustrative set of lists in the global name space of group members associated with objects as well as individual objects.

Turning to FIG. 2, a chart provides an illustrative listing of groups specified for a network system embodying the present invention and their designated management servers.

Figure 3:
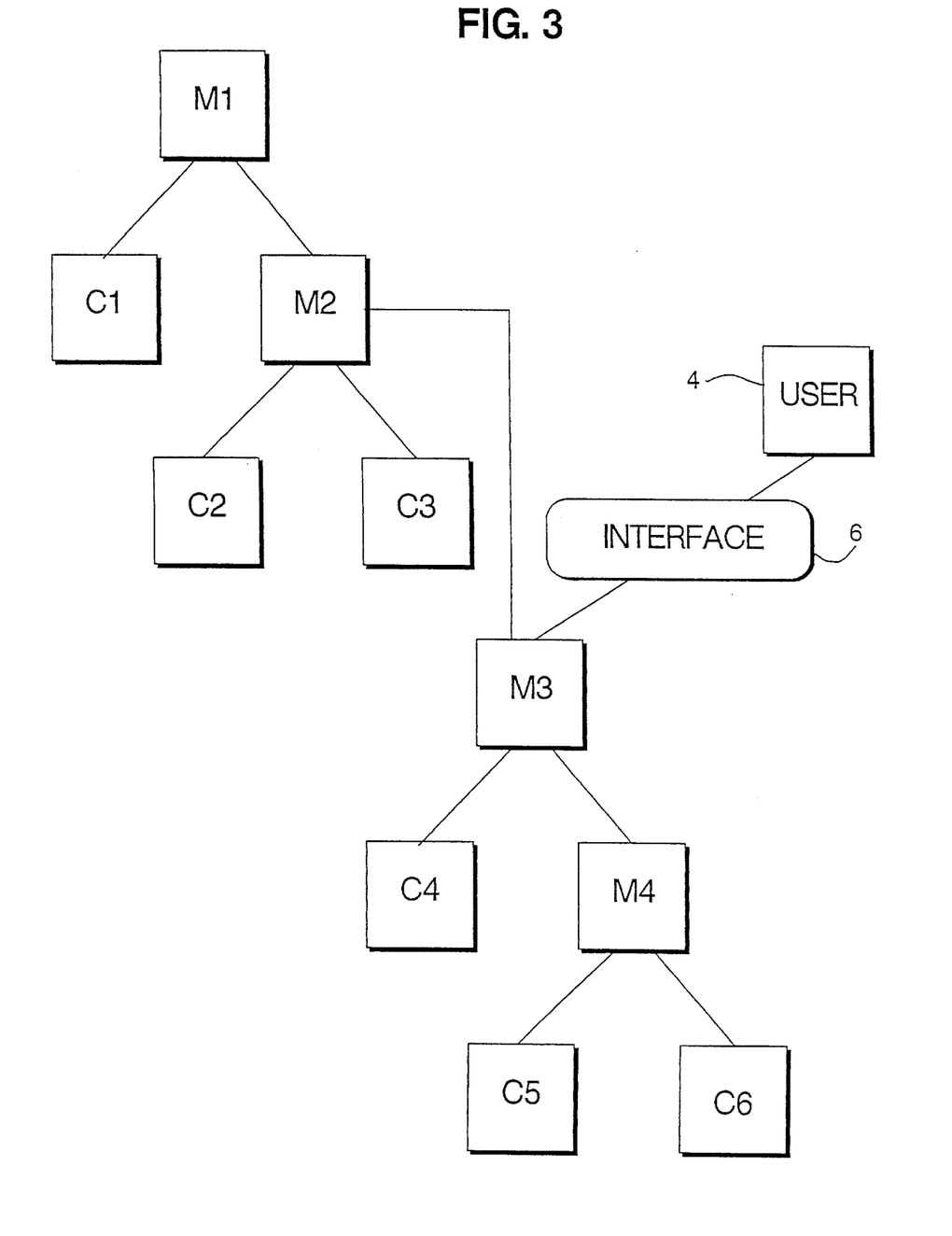
FIG. 3 is a diagram of the illustrative group compositions in the chart shown in FIG. 2.

FIG. 3 is a schematic diagram of the linking of the processes running on the network system for supporting the group operations illustrated in FIG. 2.

Figure 4:
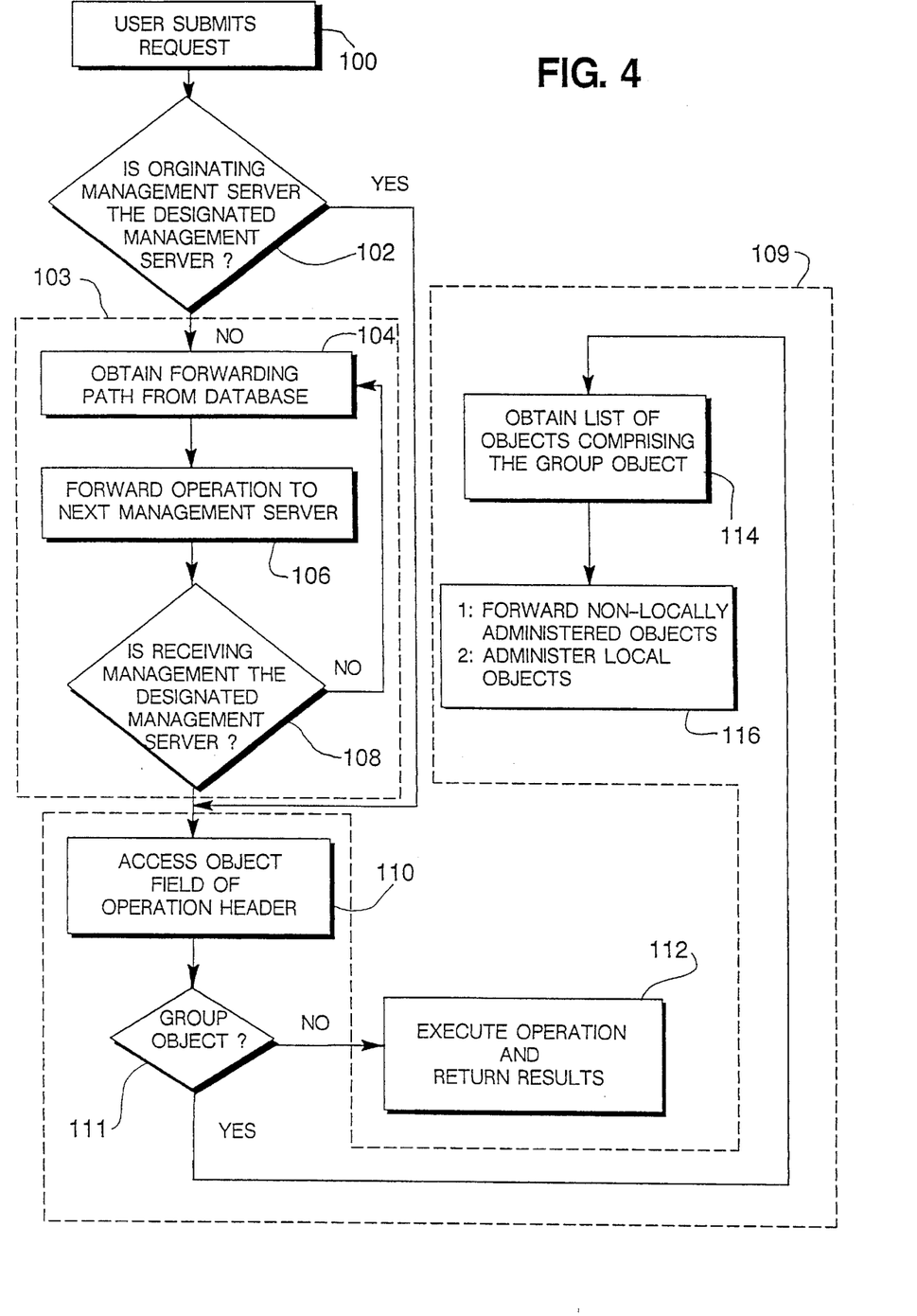
FIG. 4 is a flow chart of the steps used to transfer and thereafter perform the execution of an operation according to the present invention.

Turning now to FIG. 4, a flow diagram provides a summary of the steps for decomposing a group operation according to the present invention and the group relations illustrated in FIGS. 2 and 3. At step 100, the user 4 submits a request for performance of a network function from one or more network resources. For example, the user 4 submits a GRP1 request to the user interface 6 coupled to management server M3 in a manner well known to those skilled in the art. The user interface converts the request into an operation record containing the afore-described fields. The user interface 6, in turn, transfers the operation record to the management server M3.

After receiving the operation, at step 102, the management server M3 determines whether it is the designated management server for the submitted operation. The management server M3 accesses the target object field of the operation. The management server then accesses the list of objects in the common database 12 in order to match the target object with the designated management server for coordinating the execution of the operation. If the originating management server is the same as the designated management server, then the forwarding process ends and control passes to step 110. In the current example, however, the management server M1 is the designated management server. Therefore, control passes to the beginning of the operation forwarding loop 103 and more particularly step 104 wherein management server M3 determines the proper forwarding path for routing the operation to the designated management server M1.

At step 104, the management server M3 accesses the common database 12 and uses the contents of the target object field of the operation in order to determine the proper management server to which the operation should be forwarded. In the present example, the proper receiver of the operation is management server M2. Control then passes to step 106 wherein the management server M3 forwards the operation to the receiver management server M2 in any manner known to those skilled in the art. However, one method for forwarding the operation on a network subjected to security threats includes the security mechanism taught in the patent application concurrently filed with the present application titled "A Method for Providing a Security Facility for Remote Systems Management," having the same co-inventors and having the same assignee as the assignee of the present application. Furthermore, the forwarding operation is given top priority for execution by each management server M in order to minimize the delay in transferring operations to various destinations in the network.

Next, at step 108, the receiving management server M2 determines whether it is the designated management server. The management server M2 accesses the database 12 in the same manner described in step 102 in order to match the target object and the designated management server for executing the operation. In the present example, since management server M2 is not the designated management server, control passes to step 104 wherein the management servers M2 and M1 cooperate to execute the forwarding loop 103 once more, and management server M2 transfers the operation to management server M1 at step 106. At step 108 management server M1 determines that it is in fact the designated management server and control passes out of the forwarding loop to the execution portion 109 of the process for performing the operation.

At step 110, the management server M1 accesses the object field in the operation record. At step 111, if the object specifies a single operation, then control passes to step 112 wherein the operation is transferred to the designated host specified in the target object field and the host 14 executes the requested function. If, as in the current example, the target object (Grp1) represents a group of functions to be performed, then the management server M1 decomposes the group object and forwards each resulting operation to its designated management server and/or host.

Group decomposition consists of separating a group into its members. The members, in turn are groups or hosts. Group decomposition continues until the management servers M have decomposed each group and subgroup into single operations on individual hosts. The group decomposition and forwarding process introduces a relatively short delay to the process of executing a group operation in comparison to the delay encountered in administering a local operation. Therefore, by distributing a group operation among several management servers in a network, a network utilizing the present invention may improve the response time of the network to user group command requests.

At step 114, the management server M1, accesses the common database 12 and retrieves the list of objects designated as members of the group object Grp1. In order to expedite the group object decomposition process, each management server M gives higher priority to operations which must be forwarded to other management servers than to locally administered operations. The management server administers the execution of operations for which it is a designated management server after completing all the pending forwarding duties. In which case there is no necessity to prioritize these two duties. It is also possible that co-processors will execute these duties simultaneously. Therefore, after management server M1 identifies all the group objects contained in the list, control passes to step 116 wherein the management server M1 administers the forwarding and execution duties according to the afore-described priority scheme.

In the current example, the management server M1 transfers a function request for execution by host C1 and forwards a group object operation Grp2 to the designated management server M2 in a manner similar to the forwarding procedure of steps 104–108 in this group decomposition procedure. However, in order to track the forwarded group object Grp2 operation resulting from the decomposition of the group object Grp1 operation, the management server M1 must perform the following additional steps before forwarding the operation specifying the group object Grp2 to the designated management server M2 and the single object to host object C1.

The management server M1 modifies several fields in the parent operation record designating Grp1 as the target object. The management server M1 places the identification of each child operation record in the child field of the parent operation record. In the present example, two operations would be specified as children. One entry in the child field identifies the operation for host C1 and one entry identifies the group object Grp2 operation for management server M2.

In addition to modifying the parent operation record, the management server M1 generates packets similar to the original operation record specifying Grp1 as its target object for each of the children operations. However, the management server M1 modifies certain afore-described fields in the children's operation records in order to facilitate the generation of return messages. The management server M1 assigns a unique operation identifier to each operation record generated from the decomposition of the group object Grp1. Management server M1 places the identification of the parent operation in the afore-described parent field of each of the child packets. The management server M1 places its identification in the forwarder address field of each of the children operation records in order to facilitate the return of status information to the parent group Grp1. Finally, the management server M1 places the group object identification Grp1 into the ancestor list.

A receiving management server will check this list in order to detect group looping wherein two or more group objects form a loop of constituent objects. For example, group looping would occur if, in the illustrated group listing of FIG. 2, a system designer added Grp1 to the list of constituents of Grp3. This creates a looping group object. The management servers M1, M2 and M3 would continuously administer the group object and flood the network with single objects generated by the decomposition of the looping group object. Therefore a check of the ancestor group list within the operation record enables the management servers to prevent looping.

In the present illustrative example, after the management server M1 generates the child operation records specifying objects Grp2 and C1, it forwards the group packet Grp2 to management server M2 in the manner previously described for steps 104–108. After forwarding the operation record specifying group object Grp2, management server M1 administers the single object operation in coordination with host C1.

Management server M2 receives the operation specifying group object Grp2. After verifying that it is the designated management server, the management server M2 decomposes the group object Grp2 according to the afore-described decomposition procedure for the parent group object Grp1 comprising steps 110–116. Management server M2 decomposes Grp2 into a further group object Grp3 and two single objects C2 and C3. Each of the objects are identified in the target object field of three separate child operations. The management server executes appropriate modifications to the children field of the parent operation specifying group object Grp2, and the relevant fields of each child operation in the manner discussed above in regard to the decomposition and execution of the objects comprising the group object Grp1. After management server M2 generates the child operation records specifying as target objects C2, C3 and Grp3, it forwards the packets to appropriate destinations according to the afore-described method.

Management server M3 receives the operation specifying group object Grp3. The management server M3 verifies that it is the designated management server for the group object Grp3. Management server M3 decomposes the group object Grp3 into a further group object Grp4 and single object C4 and generates appropriate operation records for each of the constituent objects of the group object Grp3 according to the afore-described manner for decomposing group objects Grp1 and Grp2. After management server M3 generates the child operation records specifying as target objects C4 and Grp4, it forwards the packets to appropriate destinations according to the afore-described method for handling Grp1 and Grp2.

Management server M4 receives the operation specifying group object Grp4. The management server M4 verifies that it is the designated management server for the group object Grp4. Management server M4 decomposes the group object Grp4 into single objects C5 and C6. At this point, no more groups remain and the decomposition process set forth in steps 110–116 ends.

After each host system C performs each of the functions specified in the single object operation records, a status message and results, if necessary, are returned to the designated management server M for each operation record. The management server M determines whether the operation was a constituent of a decomposed group object. If the operation was a member of a group object, then the management server M adds the status and result information to a status list within the operation specifying the group object. When all of the operations generated from the group object operation have responded, the management server M returns the operation record to its parent as designated in the parent field of the operation record.

For example, once hosts C5 and C6 complete their designated functions, they return status information to management server M4. When management server M4 determines that both constituent objects of the group object G4 have completed their designated functions, management server M4 returns status information to M3.

Management server M3 waits for status information to be returned from the group object operation Grp4 and the single object operation C4 before returning status information regarding the group object Grp3. This recomposition of child status messages into the parent group operations continues until the ultimate ancestor operation receives status information from all of its children. At this point the group operation is complete. In the present example operation, the group operation is completed when M1 has received status information from host C1 as well as group object Grp2 operation status information from management server M2 for the group object operation previously submitted.

The management servers M return a group operation status record through the network to the originating management server after completing execution of the group operation by determining from the forwarder address field of the packet header the management server from which the operation was previously forwarded. In this way, the operation record re-traces its previous steps back to the originating management server.

This description of the process of re-tracing the previous distribution paths is not intended to limit the scope of the present invention. Other means for returning status information back to the user would be known to those of ordinary skill in the art. For instance, the forwarder address could be left out of the packet header. In this case, the management operations may report back to the originating management server directly from the designated management server.

After the designated management server M1 receives the returned status information from its child operations, the designated management server M1 forwards the results to the originating management server in the manner previously described for forwarding the operation from the originating management server to the designated management server or any other manner well known to those skilled in the art. The identity of the originating management server M3 is obtained from a field included in the header for the operation record.

After receiving the results of the completed operation, the originating management server M3 reports this information to the user 4 through the user interface 6. In this manner, the user is apprised of the results of the completed operation.

Thus, there has been described hereinbefore a method for providing a group administration facility for providing a means of replicating and distributing operations to multiple groups and thereby permitting multiple management operations arising from a single command to be administered by multiple management servers on multiple systems. Changes in the details and arrangements of the processes that have been described herein in order to describe the preferred embodiment of the invention may be made by those skilled in the art within the principal and scope of the present invention as set forth in the appended claims.

What is claimed is:

1. A method for administering an operation on a network of computer systems, said network of computer systems having a plurality of management servers for administering objects, a first group object having a first plurality of constituent objects and a second group object having a second plurality of constituent objects, said method comprising the steps of:

creating a name space containing a list of all objects including said first group object, said second group object, each of said first plurality of constituent objects and each of said second plurality of constituent objects, said list identifying said first plurality of constituent objects as belonging to said first group object and identifying said second plurality of group objects as belonging to said second group object;

identifying in said list an associated one of said plurality of management servers for administering each of said first group object, said second group object, each of said first plurality of constituent objects and each of said second plurality of constituent objects;

generating an operation that is directed to a first target object selected from the group consisting of said first group object and said second group object, said operation comprising at least one sub-operation directed to a second target object selected from the group consisting of said first group object, said second group object, each of said first plurality of constituent objects and each of said second plurality of constituent objects, said second target object being different from said first target object;

receiving said operation at the management server identified in said list as administering said first target object;

transferring said operation to said first target object for execution;

transferring said sub-operation to the management server identified in said list as administering said second target object;

transferring said sub-operation to said second target object for execution.

2. The method of claim 1 further comprising the step of returning results from the performance of said operation to the management server identified in said list as administering said first target object.

3. The method of claim 1 wherein said name space is created in a distributed data base accessible by all of said management servers.

4. The method of claim 1 wherein said first plurality of constituent objects or said second plurality of constituent objects contains at least one group object.

5. An apparatus for administering an operation on a network of computer systems, said network of computer systems having a plurality of management servers for administering objects, a first group object having a first plurality of constituent objects and a second group object having a second plurality of constituent objects, said apparatus comprising:

a name space containing a list of all objects including said first group object, said second group object, each of said first plurality of constituent objects and each of said second plurality of constituent objects, said list identifying said first plurality of constituent objects as belonging to said first group object and identifying said second plurality of group objects as belonging to said second group object, said list identifying an associated one of said plurality of management servers for administering each of said first group object, said second group object, each of said first plurality of constituent objects and each of said second plurality of constituent objects;

means for generating an operation, said operation being directed to a first target object selected from the group consisting of said first group object and said second group object, said operation comprising at least one sub-operation directed to a second target object selected from the group consisting of said first group object, said second group object, each of said first plurality of constituent objects and each of said second plurality of constituent objects, said second target object being different from said first target object;

said management server identified in said list as administering said first target object receiving said operation;

said operation being transferred to said first target object for execution;

said sub-operation being transferred to the management server identified in said list as administering said second target object;

said sub-operation being transferred to said second target object for execution.

6. The apparatus of claim 5 wherein results from the performance of said operation are returned to the management server identified in said list as administering said first target object.

7. The apparatus of claim 5 wherein said name space is created in a distributed data base accessible by all of said management servers.

8. The apparatus of claim 5 wherein said first plurality of constituent objects or said second plurality of constituent objects contains at least one group object.

* * * * *